United States Patent [19]

Lauber

[11] Patent Number: 4,474,399

[45] Date of Patent: Oct. 2, 1984

[54] TIRE GRIPPER

[75] Inventor: Michael L. Lauber, Akron, Ohio

[73] Assignee: The Firestone Tire & Rubber Company, Akron, Ohio

[21] Appl. No.: 424,811

[22] Filed: Sep. 27, 1982

[51] Int. Cl.³ .............................. B29H 5/02; B66C 1/46
[52] U.S. Cl. .................................... 294/88; 156/406.2; 294/63 A; 294/86 R; 425/38
[58] Field of Search ................. 294/63 A, 67 R, 67 B, 294/67 BA, 67 BB, 86 R, 88, 90, 93, 94, 97, 99 R, 106, 113; 156/406.2; 425/32, 33, 36, 38, 43, 47

[56] References Cited

U.S. PATENT DOCUMENTS

| | | | |
|---|---|---|---|
| 3,065,503 | 11/1962 | Mallory et al. | 425/38 |
| 3,151,013 | 9/1964 | Nebout | 156/406.2 |
| 3,219,382 | 11/1965 | Hugentobler | 294/93 X |
| 3,233,315 | 2/1966 | Levake | 294/93 X |
| 3,845,979 | 11/1974 | Schatz et al. | 294/88 |
| 4,105,486 | 8/1978 | Cantarutti | 294/90 |
| 4,148,681 | 4/1979 | Collins et al. | 156/406.2 |
| 4,410,210 | 10/1983 | de Sivry et al. | 294/93 X |

Primary Examiner—Johnny D. Cherry
Attorney, Agent, or Firm—Ronald Brietkrenz

[57] ABSTRACT

A first stage green tire handling device employing radially directed air springs mounted within a support frame in order to grasp the highly flexible cylindrically shaped first stage green tire. The green tire handling device is particularly adapted to be used in conjunction with automated equipment and may distort the highly flexible green tire in order to facilitate its application with automated machinery.

1 Claim, 7 Drawing Figures

TIRE GRIPPER

BACKGROUND OF THE INVENTION

1. Field of the Invention

This invention relates to a material handling means and more particularly to a means adapted to grasp and transport relatively flexible cylindrically-shaped objects. Specifically, the instant invention relates to a tire gripper adapted to grasp and transport a first stage green tire by using a plurality of air springs to grip the outer surface of the first stage green tire.

2. Description of the Prior Art

The use of air actuated means to facilitate the gripping of an article is well-known in the art as evidenced by U.S. Pat. No. 3,620,561 to Grotkasten, et al., relating to a tire transporting device having tire engaging members actuated by air cylinders; U.S. Pat. No. 3,809,423 to Gazuit which relates to a tire loader for a tire curing press which is actuated by an air cylinder; U.S. Pat. No. 3,845,979 to Schatz, et al., which discloses a tire handling device having hangers which are adapted to grasp the bead of a tire and are actuated by air cylinders; and U.S. Pat. No. 4,105,486 to Cantarutti which discloses a tire transfer device employing an outer gripping means actuated by air cylinders.

Even further, the use of a flexible, pneumatically expanded member such as a bellows or rubber air bag is well known in the art as evidenced by U.S. Pat. No. 3,056,625 to Timmerman which discloses the use of glands or air bags to displace a pivotally mounted member which is in turn utilized to grasp an article; U.S. Pat. No. 3,967,946 to Campbell which discloses the use of a bellows in connection with a mold holder; U.S. Pat. No. 4,148,681 to Collins, et al., which shows an expansible member utilized for transferring a tread from a first work station to a further work station in a tire building machine; and U.S. Pat. No. 4,254,984 to Abraham, et al., which discloses the use of air bags to actuate a lever system adapted to grasp articles.

Although the above-noted prior art discloses several means for utilizing an expandable member for material handling purposes, the requirements for a material handling device for a first stage single ply radial tire carcass differ substantially from those provided by the prior art means.

Specifically, the first stage green carcass of a single ply radial tire is in the form of a highly flexible cylindrically-shaped member. The highly flexible nature of the first stage tire carcass poses a significant material handling problem that cannot be solved by the prior art. Even further, there is a need for a means for a material handling means which may be used in conjunction with automated equipment and is readily adapted to allow the transfer of the tire carcass from the material handling means to a work station. For instance, in transferring the first stage tire carcass from the material handling means to an universal bladderless drum, it is necessary to cause a slight squaring of the cylindrical configuration of the tire carcass in order to facilitate the slipping of the tire carcass over the drum of the universal bladderless drum machine.

The prior art devices do not disclose any means for providing such a controlled deformation in order to facilitate loading and unloading.

There is, therefore, a need for a means for handling a highly flexible cylindrically-shaped member in such a manner as to allow a slight deformation of the cylindrically-shaped member in order to facilitate the transfer of the cylindrically-shaped member from the material handling means to a work station.

The instant invention solves these problems by providing a means of grasping the highly flexible cylindrically-shaped first stage tire carcass in such a manner as to allow selective deformation of the tire carcass in order to facilitate transfer of the tire carcass between the material handling means and a work station.

SUMMARY OF THE INVENTION

The present invention relates to a means for handling a highly flexible cylindrically-shaped first stage single ply tire carcass and more particularly to a series of air actuated expandable members adapted to grasp the tire carcass for transporting and for additionally, selectively deforming the tire carcass in order to facilitate the transfer of the tire carcass from the handling means to a work station.

DESCRIPTION OF AN EXEMPLARY EMBODIMENT

Figure 1:
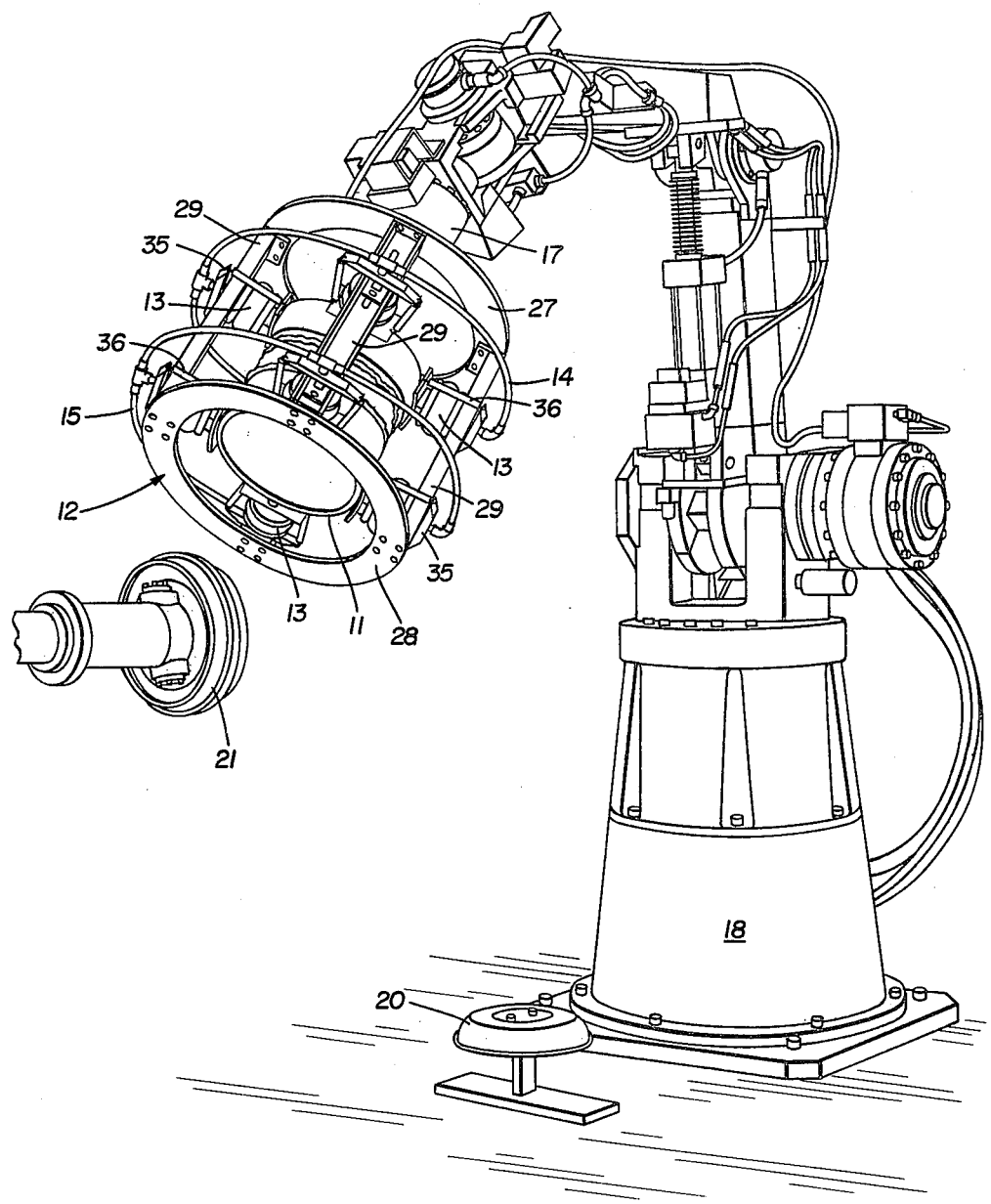
FIG. 1 is an overall perspective view of the instant invention showing its relationship with a work station.

Referring now to FIG. 1 of the drawings, there is disclosed a perspective view of the tire gripping means employed by the instant invention. A first stage green tire 11 is disposed within a support frame 12 and maintained within the support frame 12 by means of a plurality of expanding members 13. The expanding members, in the exemplary embodiment, are pneumatically controlled air springs and are provided air by air supply lines 14 and 15.

By selectively providing an air pressure on the air supply lines 14 and 15, the expanding members may be expanded or retracted in order to grasp the first stage green tire 11 and retain it within the support frame 12.

The support frame 12 is fixedly attached to the end of articulated arm 17 of manipulator 18. In the exemplary embodiment, the manipulator 18 is a Cincinnati Milicron HT-3 manipulator manufactured by the Cincinnati Milicron Corporation of Cincinnati, Ohio.

It should be appreciated that due to the six axes of motion provided by the manipulator 18, the first stage green tire 11 may be positioned relative to the work station 21 in order to facilitate the transfer of the first stage green tire 11 from the support frame 12 to the work station 21.

There is thus provided a means for transporting a first stage green tire 11 from an initial register position 20 to a work station 21. In the exemplary embodiment, the work station 21 is the work station of a second stage tire building machine such as that disclosed in U.S. Pat. No. 4,105,486 to Cantarutti.

Figure 2:
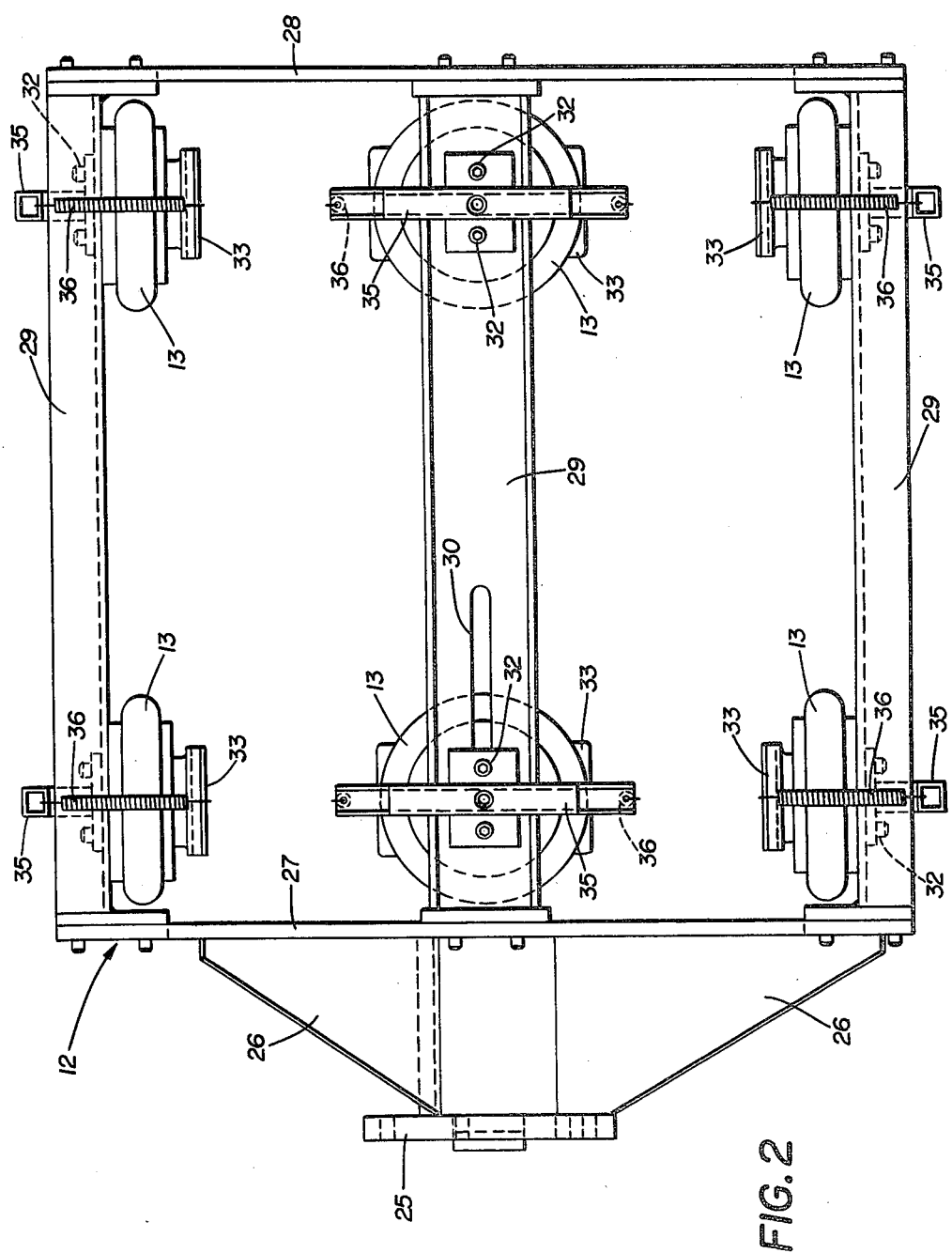
FIG. 2 is a side view of the material grasping means of the instant invention.

FIG. 2 of the drawings discloses further details of the support frame 12 and the expanding members 13. The support frame 12 includes mounting plate 25 which is adapted to affix the support frame 12 to the articulated arm 17 of the manipulator 18. Attached to the mounting plate 25 by gussets 26 is first end plate 27. A second end plate 28 is held in a spaced relationship with respect to the first end plate 27 by means of longitudinal spacing members 29 which are affixed at one end to the first end plate 27 and at the opposite end to the second end plate 28. There is thus provided a plurality of longitudinal spacing members 29 which are maintained in a spaced relationship in order to provide a means for mounting the expanding members 13 to said longitudinal spacing members 29 to allow the expanding members 13 to effectively coact with a cylindrically shaped object. It should be noted that slots 30 may be provided in the spacing members 29 in order to allow the expanding members 13 to be adjusted to facilitate different sizes of first stage green tires.

Figure 3:
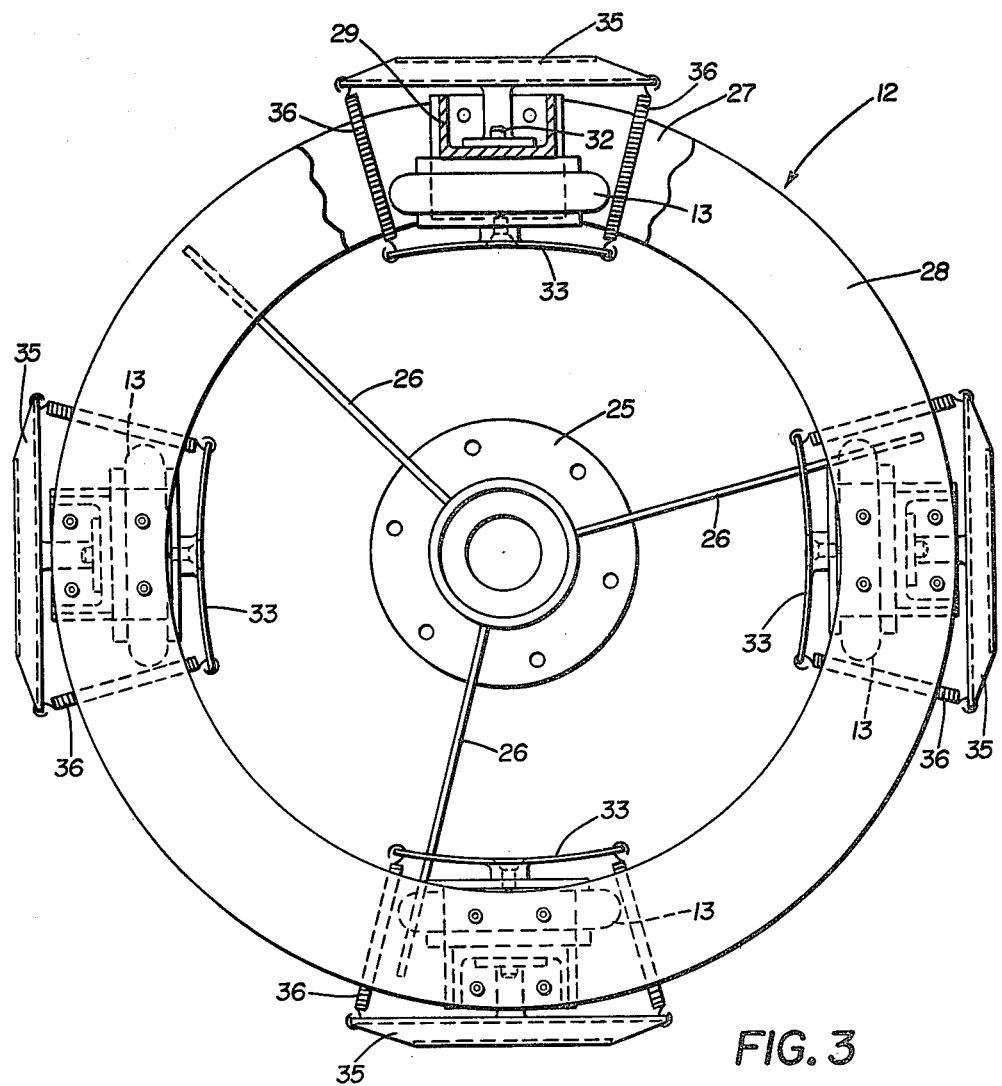
FIG. 3 is an end view of the material grasping means of the instant invention with portions broken away for clarity.
Figure 4:
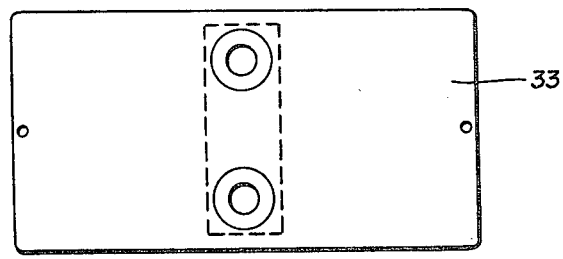
FIG. 4 is a detail of the pad member employed by the instant invention.

Details of the expanding members are more fully disclosed in FIG. 3 of the drawings. The central portion of the longitudinal spacing members 29 are of a generally channel cross section as disclosed in FIG. 3. An expanding member 13 is affixed directly to the longitudinal spacing member 29 by means of bolts 32 more clearly disclosed in FIG. 2 of the drawings. In the exemplary embodiment, the expanding member 13 is an Air Stroke Model No. 16NBD7601 air spring manufactured by The Firestone Tire & Rubber Company, Akron, Ohio 44317.

Directly affixed to the opposite end of the expanding member 13 is pad member 33 which is adapted to make physical contact with the first stage green tire 11 when the support frame 12 is positioned over a first stage green tire and the expanding members 13 are caused to expand. It should be noted that the pad member 33 is generally rectangular in configuration and has a slight arc. In the exemplary embodiment, the radius of the arc of the curvature of pad member 33 is preferably larger than the radius of the first stage green tire for reasons that will be discussed more fully below. In addition, the gripping surface of the pad member 13 is arc sprayed with a grit-type material in order to cause the gripping surface of the pad member 33 to more securely grasp a first stage green tire 11.

Affixed to the longitudinal spacing members 29 by means of bolts 32 is spring support member 35. The spring support member 35 is comprised of a square mounting plate, having affixed thereto a tubular member having a length larger than the diameter of the expanding members 13. Attached to the ends of the spring support members are springs 36 which have their opposite ends affixed to the pad members 33 such that the pad members 33 are spring biased towards the spring support member 35 in order to provide for a complete retraction of the expanding members 13 when they are not being provided with air pressure.

Figure 6:
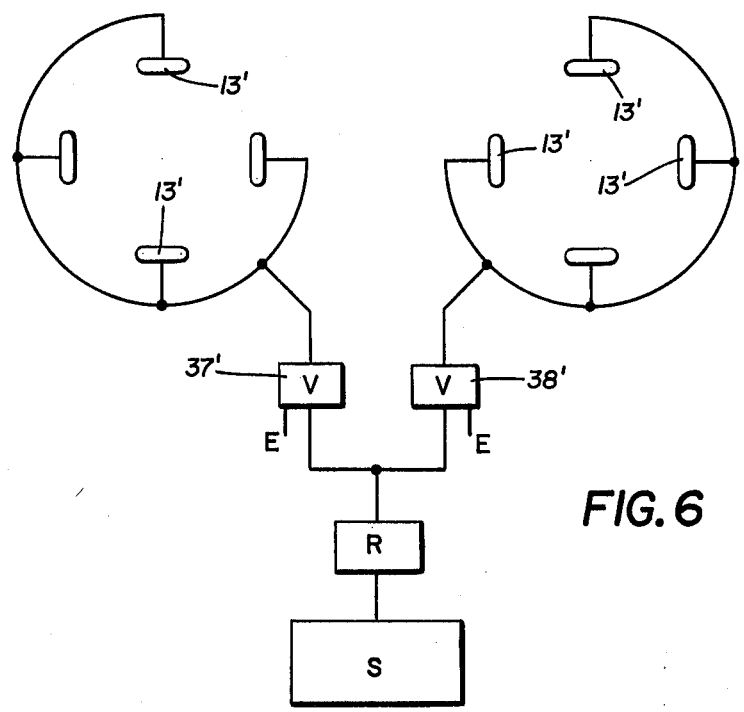
FIG. 6 is a schematic diagram of pneumatic circuitry employed by the instant invention.

Referring now to FIG. 6 of the drawings, there is disclosed a simplified schematic drawing of the pneumatic circuitry employed by the instant invention. The expanding members 13' are grouped into two groups of four representing the two groups of four expanding members mounted in the support frame 12. It should be noted that each group of expanding members is ported to control valves 37 and 38. The control valves 37 and 38 are provided air pressure from air supply S, via regulator R. The return air supply is exhausted to the atmosphere as indicated by exhaust E.

It may now be appreciated that by selectively actuating the valves 37 and 38, the two groups of expanding members may be selectively expanded. In the exemplary embodiment, the green tire 11 is first picked up off of a flat surface by utilizing only the outer group of expanding members grasping the upper portion of the green tire 11. The green tire 11 is then placed on the initial register position 20, thereby allowing both groups of expanding members to grasp the green tire 11.

Figure 5:
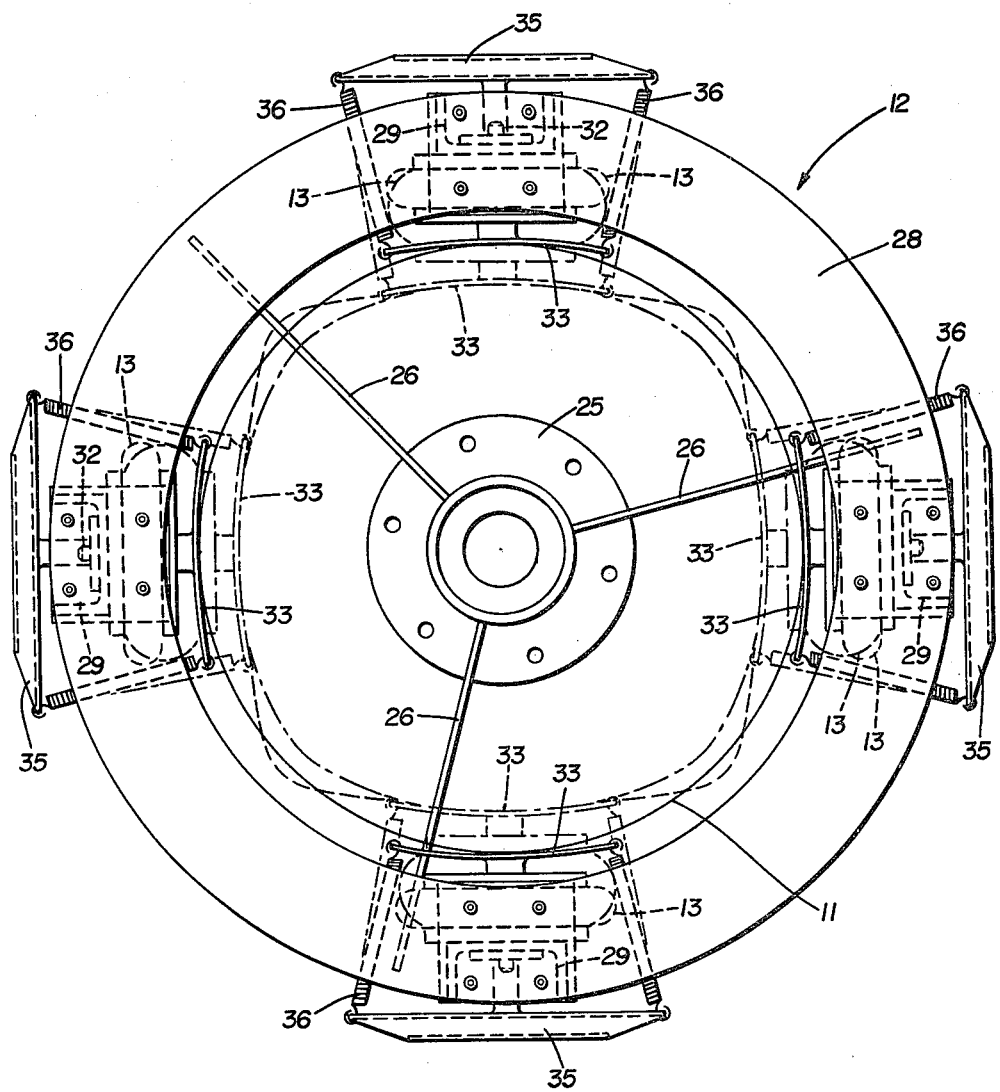
FIG. 5 is a schematic end view of a tire carcass grasped by the instant invention and showing in exaggerated form the controlled deformation thereof.

An equal expansion of all of the expanding members 13', will cause the first stage green tire 11 to assume a squarish configuration as disclosed in FIG. 5 of the drawings. The squarish configuration of the first stage green tire 11 facilitates application of the first stage green tire 11 to the work drum of the work station 21. Specifically, the diameter at the work drum is larger than the inside diameter of the edge of the green tire 11. Hence, it is necessary to deform the green tire 11 in order to allow it to be started over the work drum. Once the tire is started on the work drum, it can then be stretched in order to complete its application to the work drum. It should be appreciated that the diameter of the pad members 33 should be greater than the diameter of the green tire 11 in order to facilitate deformation of the green tire 11 when the expanding members 13' are expanded.

Figure 7:
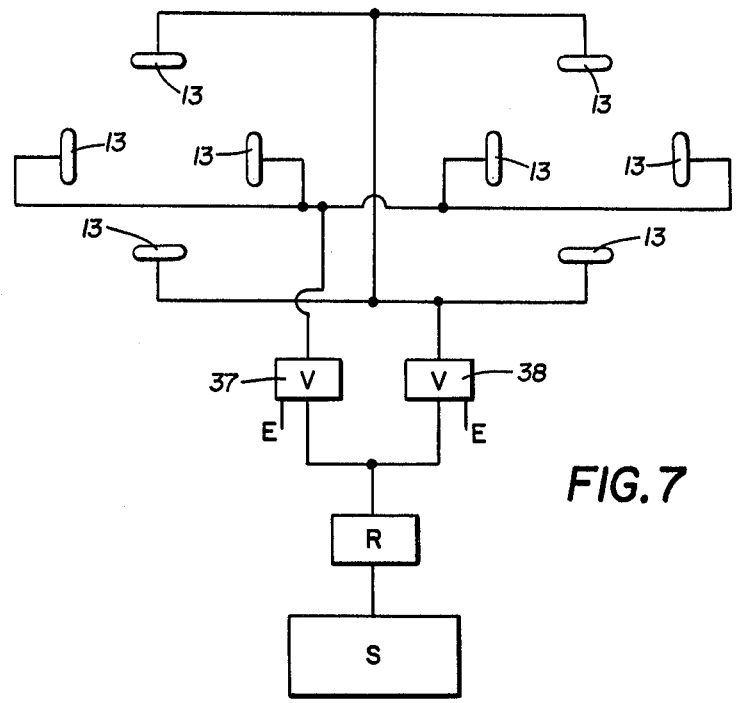
FIG. 7 is a schematic drawing of pneumatic circuitry that may be employed in an alternative embodiment of the instant invention.

It will be readily appreciated by one skilled in the art that the pneumatic circuitry employed to expand the expanding members 13 may be varied in order to selectively deform the green tire 11. An example of such a modification would be to employ a common valve and circuitry for all eight expanding members 13. Alternatively, diametrically opposed pairs may each have their own pneumatic circuit, as shown in FIG. 7 of the drawings, in order to produce deformation of a green tire.

Due to the nature of the expanding members 13, the first stage green tire will be centered within the support frame 12. As the expanding members 13 are expanded by supplying air pressure to them, the diameter of the expanding members will decrease as the expanding members are expanded. Due to the decrease in the diameter of the expanding members, the force exerted by the expanding members with a constant air supply pressure will decrease. Since all of the air springs within a given control circuit are maintained at the same pressure, there will also be maintained the same pressure within the expanding members 13 such that even with an uneven load applied to the expanding members 13, the expanding members 13 will tend to center the object within the support frame 12.

It should be noted that the gripping action of the expanding members 13 is a function of the air pressure supplied to the expanding members. Accordingly, a change in the air supply pressure will change the gripping action of the expanding members 13 in order to afford a readily adjustable gripping means.

It should also be noted that since the tire gripper grasps the first stage green tire on the ply beads near the ends of the green tire, a concave first stage green tire may be readily grasped by the instant invention.

There is thus provided a first stage green tire gripping means comprised of eight expanding members mounted on the inside circumference of a generally cylindrical support frame in two groups of four expanding members wherein each expanding member is mounted 90° apart. When the expanding members are energized, they move their attached pads radially inward to grip the tire in the bead area. The gripping action of the tire gripping means causes the first stage green tire 11 to become somewhat distorted in order to facilitate application of the first stage tire to a tire building drum.

It will be apparent to those skiled in the art that various modifications and additions may be made in the instant invention without departing from the essential features thereof, which are intended to be defined and secured by the appended claims.

What is claimed is:

1. An apparatus for grasping the outside of generally cylindrically shaped articles, comprising:

a. frame means having a generally cylindrically shaped configuration and adapted to have expandable means affixed thereto;
   b. at least two sets of expandable means, each set having at least four expanding members, each expanding member having an axis of expansion affixed to said frame means, said expanding members having their axis of expansion intersecting at a common point;
   c. spring biased gripping means affixed to said expanding members wherein said gripping means has a radius of curvature larger than the radius of said generally cylindrically shaped article; and
   d. control means adapted to selectively expand said first set of expandable means relative to said second set of expandable means in order to selectively deform said generally cylindrically shaped article to facilitate the placement of said article over a generally cylindrically shaped holding means.

* * * * *